United States Patent Office 3,096,167
Patented July 2, 1963

3,096,167
HERBICIDAL METHOD
John M. Farmer, Sunnyside, Wash., assignor of one-half to Harvey Krueger, Richland, Wash.
No Drawing. Filed Feb. 15, 1960, Ser. No. 8,490
1 Claim. (Cl. 71—2.1)

This invention relates to an improved method and means of applying agricultural chemicals and, more particularly, is concerned with the formation of elongated flexible strands containing soil sterilants and/or herbicides and the use of such strands in plant growth control.

Herbicidally active compounds and soil sterilants are well know. They exist in powder form, or they may exist as solutions or dispersions in fluid media. In such forms the compositions are applied as a spray or as a dust to the area to be treated for protection from undesirable plant growth such as weeds, unwanted grasses, vines, or the like, in other words, plants growing where they are not wanted. Where areas are large or discriminatory application between wanted and unwanted plants is easy, sprays and dusts produce effective applications. However, where plants wanted and unwanted are close together or it is desired to separate and demark such plant areas in such a way as to avoid unwanted plants crossing a line of demarcation, sprays and dusts are not practical, due to the lateral drift of the herbicide in air currents flowing over the earth. It is therefore an important object of this invention to provide a method and means of applying agricultural chemicals to the earth and plant life while avoiding undesirable lateral migration or drift.

Among the known herbicides and/or soil sterilants most effective for the purposes of this invention are the chlorates, bromates, symmetrical triazines, and the N-aryl urea compounds. The more desirable herbicides are those which are water soluble although those soluble in other solvents are useful to a certain degree. Other herbicides than those listed will occur to those skilled in the art of agricultural chemistry and plant growth control and it is intended herein to embrace such.

In general the method of this invention comprises forming or shaping an agricultural chemical material into a dry, filamentary form which may then be disposed or placed with accuracy along a line on the earth where the herbicidal or sterilizing effect is desired. Once placed, the composition is dispersed into the soil and on occasion onto adjacent plant growth.

A means by which the practice of this method is facilitated comprises incorporating the sterilant or herbicide into an elongated non-rigid strand or fibrous carrier element. Preferably the carrier element is a cord or string which may be easily and accurately laid along the earth. When the sterilant or herbicide thus placed is dissolved and leached into the soil and onto adjacent plant life, as by the application of a solvent, its effects will be directly and limitedly applied as desired.

More specifically the agricultural compound in solution or dispersion may be incorporated into a twisted cotton or hemp-like string or cord carrier element by wetting the same and thereafter dissipating the solvent or vehicle. This deposits the compound on, in, and among the fibers of the carrier element. Alternatively the herbicide or sterilant in dry, semi-dry, or paste form may be placed in the hollow center of a tubular or spiral wrapping forming the carrier element much the same as blasting fuses and the like are produced. Such elongated carrier elements are easily packaged, transported and used in commerce. They are laid on the ground surface in either a straight line or on curved lines as desired to define the narrow area to be treated. The carrier element may be immediately drenched with a solvent, i.e. water, in the case of water-soluble compounds, to cause the compound to dissolve and leave the carrier and enter into or spread on the soil and neighboring plants. Or, with water soluble chemical compositions, the dissolving and leaching action may await a sprinkling as from rain or from garden wetting systems.

A particularly useful application of this invention is found in gardens where it is desired to sharply demark and separate grass plots from cultivated garden plots. In such a situation it is a common difficulty for the gardner to control creeping grasses and weeds that tend to grow between such plots. Heretofore weed control chemicals and soil sterilizers have been so non-discriminating in their action and in their application by spraying and dusting as to preclude application with sharp demarcation and without harmful drift or lateral misapplication. In using the means of this invention the gardener merely lays the composition-containing cord of this invention on the ground. He may stake or pin it to the ground as when curved lines are being followed. There it remains until the chemical composition has dissolved and left the cord and either attacked the adjacent plants or entered the soil. Later, the cord may be lifted and removed. Or the cord may be placed in a shallow trench and covered with soil whereby it will later rot and disintegrate due to natural processes of destruction.

Among the herbicides and sterilants which have been found useful the more effective are the alkali metal chlorates of which sodium and potassium which may be chlorates, used with or without a diluent such as penta- or a metaborate. Another very effective compound and sterilant is found in the symmetrical, triazine compounds, of which the compound known as 2-chloro-4,6 bis-(ethylamino)-s-triazine is particularly effective. It has been discovered practical to combine one of the alkali metal chlorates and a symmetrical triazine in aqueous media and, by soaking an absorbent cord therein, apply the same to a twisted fibrous carrier. The chemical compounds enter into and deposit on the carrier fibers. The carrier is then dried for convenient handling, marketing and the like. Or the carrier may be soaked at the site and used in its wet condition. In either event once placed where desired the carrier is wetted or drenched with a solvent for the compound which causes the chemical materials to be applied to contacting plants or the soil or both.

Very practical results have been obtained using a thirty-two ply twisted cotton twine into which 2-chloro-4,6-bis-(ethylamino)-s-triazine has been deposited from aqueous solution and the twine dried. The triazine was applied from water solution at the rate of approximately one ounce to six hundred lineal feet of cord. When the cord was placed directly in the soil it was found that a strip of earth approximately two to two and one-half inches wide and between four and six inches deep was sterilized to such extent that all growth therein was materially inhibited for a period in excess of six months during an active growth period of a year. Specimen cross-sections of the treated and adjacent untreated soil were cut, removed and examined. It was noted that roots and rootlets of plants growing in the laterally adjacent untreated areas terminated at a sharply demarked line of sterility obtained for the described treatment.

The aqueous triazine solution above described comprised one ounce of the triazine in one pint of water in which about six hundred feet of twisted cotton cord was immersed, soaked and thoroughly wetted. The cord was then air dried. Wetting agents may be employed to speed absorption.

Alternatively the chemical materials may be compounded into moist pastes by the use of carrier or adjuvant materials in liquid or solid form. Solvents useful are water for the water soluble compounds, and acetone furfural, ethanol and the like for non-water soluble compounds. Also finely divided inert solids such as talc, clay, diatomaceous earth, and flours derived from walnut shells, wheat, soya bean, cottonseed, and various barks are likewise useful. Other solid carriers may include materials selected from the carbonates, phosphates, and sulphur, lime or the like. Such carriers may be used in varying amounts between about one percent and ninety-five percent by weight of the agricultural compound depending on the strength of the composition that may be desired.

Such paste composition may be extended in conventional machines in a spaghetti-like form and dried and cut for use in relatively short sections. Or such an extension may be wrapped with a spirally applied paper cover or a woven or extruded porous sheath forming a tube about the chemically active paste, much in the manner in which blasting fuses are produced. Paper cord comprising strips of paper spirally twisted in the manner of threads in many conventional twine and cords is also useful for receiving the chemical compounds in solutions through a soaking operation, followed by drying to remove the solvent.

Experience has taught that the triazine compounds are effective on shallow rooted plants, whereas the chlorate compounds penetrate more deeply into the earth. The triazines appear to operate to sterilize the soil, or at least to inhibit plant growth to depths in the sod of three or four inches, depending on the concentration of the compound applied. The chlorate compounds by comparison appear to be more rapidly taken up by the soil and again depending on concentration will very shortly after application to the surface produce notable effects on roots five and six inches below the surface and with time their effects have been noted to depths of at least twenty-four inches. The chlorates should be used at a rate of about one to two and one-half pounds per six hundred lineal feet to be treated by this invention. The triazines as explained may be used at a lower rate of application. The triazine and chlorate compounds may be mixed and jointly applied or, when used singly, provide selective applications permitting choice and selectivity in plant growth control.

Having thus described the invention, what is claimed is:

The method of retarding the spread of plant growth outward from a plot of vegetation, comprising: incorporating a water-leachable soil sterilant deleteriously effective to growth of vegetation into an elongated non-rigid fibrous carrier element; disposing said carrier element in close proximity to the earth surface along the line at which it is desired to retard the spread of vegetation; and applying water to said carrier element to leach said soil sterilant from said carrier element into the earth along the line defined by said carrier element.

References Cited in the file of this patent

UNITED STATES PATENTS

| | | |
|---|---|---|
| 1,534,289 | Teppet | Apr. 21, 1925 |
| 1,882,377 | Whittelsey | Oct. 11, 1932 |
| 2,394,916 | Jones | Feb. 12, 1946 |
| 2,436,770 | Hill et al. | Feb. 24, 1948 |
| 2,490,924 | Schertz | Dec. 13, 1949 |
| 2,580,653 | Bridgeman | Jan. 1, 1952 |
| 2,648,165 | Nestor | Aug. 11, 1953 |
| 2,741,550 | Emond | Apr. 10, 1956 |
| 2,891,855 | Gysin et al. | June 23, 1959 |

FOREIGN PATENTS

| | | |
|---|---|---|
| 907,739 | France | Mar. 20, 1946 |

OTHER REFERENCES

Felber in "New York Times," Sunday, Jan. 25, 1948, Sec. 4, page E9.